United States Patent
Bussjager et al.

(10) Patent No.: US 6,385,985 B1
(45) Date of Patent: May 14, 2002

(54) HIGH LATENT CIRCUIT WITH HEAT RECOVERY DEVICE

(75) Inventors: Ruddy C. Bussjager, Chittenango; James M. McKallip, Pompey; Lester N. Miller, East Syracuse, all of NY (US)

(73) Assignee: Carrier Corporation, Syracuse, NY (US)

( * ) Notice: Subject to any disclaimer, the term of this patent is extended or adjusted under 35 U.S.C. 154(b) by 363 days.

(21) Appl. No.: 08/759,394

(22) Filed: Dec. 4, 1996

(51) Int. Cl.$^7$ .............................................. F25D 23/12
(52) U.S. Cl. ......................................... 62/259.1; 62/90
(58) Field of Search .............................. 62/90, 89, 93, 62/95, 314, 259.1; 165/54

(56) References Cited

U.S. PATENT DOCUMENTS 5,179,998 A * 1/1993 Des Champs ................. 62/90
5,551,245 A * 9/1996 Calton et al. .................. 62/90
5,622,057 A * 4/1997 Bussjager et al. ............. 62/173

FOREIGN PATENT DOCUMENTS

| JP | 157282 | * 6/1993 | ................... 62/90 |
| SU | 1442793 | * 12/1988 | ................... 62/90 |

* cited by examiner

Primary Examiner—William E. Tapolcai

(57) ABSTRACT

A conventional air conditioning system has a heat recovery device installed therein such that the return air from the space is passed through a heat gaining portion thereof, and the resupply air passes through a heat rejection portion thereof. Substantially 100% outside air is passed through the heat rejection portion thereof where it is cooled prior to passing through the evaporator coil and to the space to be cooled. After the return air is passed through the heat gaining portion, it is passed through the condenser coil and then discharged outside. A subcooler is preferably provided downstream of the evaporator coil, and an evaporative cooler is preferably placed upstream of the heat gaining portion of the heat recovery device to provide substantially improved cooling and dehumidification characteristics.

3 Claims, 3 Drawing Sheets

HIGH LATENT CIRCUIT WITH HEAT RECOVERY DEVICE

BACKGROUND OF THE INVENTION

This invention relates generally to air conditioning systems and, more particularly, to an improved method and apparatus for controlling the humidity in a space.

With conventional air conditioning systems, little effort is made to control the humidity in the space being cooled and, as a result, in order to achieve the degree of desired comfort, it is necessary to bring the space down to a lower temperature than would otherwise be required. Such an "over cooling" function is relatively expensive and also may be cause for discomfort to one in the space being cooled.

An improvement was made to the conventional air conditioning system by the addition of a subcooler on the downstream side of the evaporator as shown and described in U.S. patent application Ser. No. 08/520,896, filed on Aug. 30, 1995, now U.S. Pat. No. 5,622,057, Here, the latent affect of the evaporator coil is enhanced by the added subcooler coil, and the humidity is substantially reduced.

Another approach that has been taken to control humidity in a space is that of using desiccants to supplement the conventional air conditioning system. Such a system is shown in U.S. Pat. No. 5,551,245, issued on Sep. 3, 1996. Although such a desiccant system can provide even greater humidity control than that of the subcooler approach mentioned above, the fabrication and installation costs thereof would be substantially greater.

Because of the tight construction of buildings erected today, there is now the condition known as the "sick building" syndrome, wherein there is insufficient leakage of outside air into the building such that the same air is recycled over and over and becomes stale and stagnant. To avoid this problem, there is now an ASHRAE standard code establishing prescribed requirements for minimum replenishment of air volumes in public buildings. This is presently being accomplished by the use of economizers, but present systems will not accommodate the use of 100% outside air since the cooling capacity is generally not sufficient to do so.

It is therefore an object of the present invention to provide an improved method and apparatus for the control of humidity in an air conditioned space.

Another object of the present invention is the provision for ensuring that the air in a building does not become stale.

Yet Another object of the present invention is the provision for controlling humidity in an economical and effective manner.

These objects and other features and advantages become more readily apparent upon reference to the following description when taken in conjunction with the appended drawings.

SUMMARY OF THE INVENTION

Briefly, in accordance with one aspect of the invention, a heat recovery device is placed upstream of the evaporator coil of an air conditioning system. The heat recovery device has two air streams flowing therethrough, in a sensible heat exchange relationship. The return air from the space being cooled is passed through the heat recovery device to achieve a sensible heat gain prior to its discharge outside. On the other side of the heat recovery device, supply air is brought in from the outside and passed through the heat recovery device to be cooled and thereby brought closer to the dew point prior to its being passed through the evaporator coil. In this way, the latent effect of the evaporator coil is substantially enhanced and the humidity of the air passing to the space is reduced because of the increased amount of condensation that occurs at the evaporator coil.

By another aspect of the invention, the heat recovery arrangement described above is used in combination with a subcooler placed downstream of the evaporator coil such tha the refrigerant passing to the evaporator is subcooled. In this way, the latent effect of the evaporator coil is further enhanced and the humidity is further reduced.

By yet another aspect of the invention, an evaporative cooler is placed in the flow of the return air stream, upstream of the heat recovery device. The return air is then first cooled prior to its entry into the heat recovery device, thereby increasing the temperature difference from that of the outside air and increasing the cooling effect to that air prior to its being passed to the evaporator coil.

By still another aspect of the invention, the evaporative cooler is placed below the evaporator coil such that the condensate from the evaporator coil can be used as the water for the evaporative cooler medium.

In the drawings as hereinafter described, a preferred embodiment is depicted; however, various other modifications and alternate instructions can be made thereto without departing from the true spirit and scope of the invention.

DESCRIPTION OF THE PREFERRED EMBODIMENT

Figure 1:
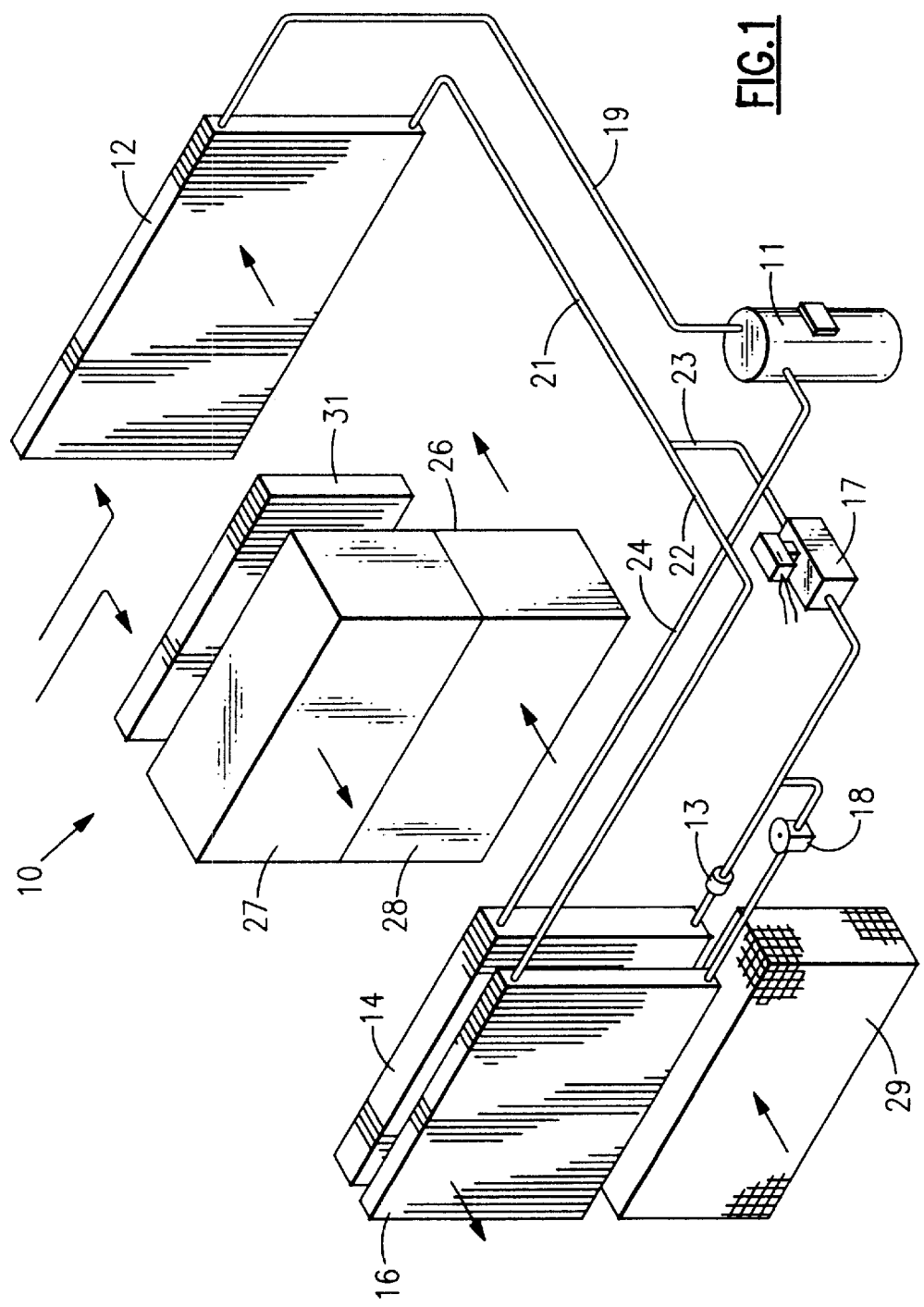
FIG. 1 is a schematic, prospective illustration of an air conditioning system with the prevent invention incorporated therein.

Referring now to FIG. 1, the invention is shown generally at 10 as applied to an air conditioning system having a subcooler included as described in U.S. patent application Ser. No. 08/520,896 filed on Aug. 30, 1995 in the names of Bussjager et al. (Docket No. 8562) and assigned to the Assignee of the present invention. That application is hereby incorporated by reference and is hereinafter referred to as the Bussjager patent.

The system includes a compressor 11, a condenser coil 12, an expansion device 13 and an evaporator coil 14 connected in serial flow relationship to operate in a conventional manner. Although the present invention can be used in a heat pump system, it is most useful in an air conditioning system and will, for purposes of simplicity and description, be described in terms of such a system, with the understanding that a reversing valve (not illustrated) could be included such that the system would operate in the heating mode.

The system also includes a subcooler coil 16, a solenoid valve 17, and a thermal expansion valve 18. These components, along with other subcomponents (not illustrated), operate in the manner described in the Bussjager patent mentioned hereinabove. Briefly, on the high pressure side, the refrigerant gas is compressed by the compressor 11 and passed along line 19 to the condenser coil 12 where the refrigerant is cooled and condensed to a liquid which is then passed along line 21, which branches into a subcooler inlet line 22 and a bypass line 23. If the solenoid 17 is closed, as will automatically occur when the sensed conditions are such that subcooling is desired, then the liquid refrigerant will pass along line 22 into subcooler 16 where it is subcooled by the air coming from the evaporator. The subcooled liquid refrigerant then passes through the TXV18 which functions to modulate the flow of subcooled liquid refrigerant in accordance with the refrigerant temperature and suction temperature as is more fully described in the Bussjager patent. The liquid refrigerant then passes through the expansion device 13 and into the evaporator coil 14, with the refrigerant gas then passing along line 24 to the compressor 11 to complete the cycle.

When sensed conditions are such that the subcooler function is not desired, the solenoid valve 17 is automatically opened and the refrigerant passes through the bypass line 23 through the solenoid valve 17 and into the evaporator 14 by way of the expansion device 13 without having passed through the subcooler coil 16. Again, after passing through evaporator coil 14 the refrigerant gases pass along line 24 to the compressor 11 to complete the cycle.

Considering now the purpose and structure of the present invention, a heat recovery device 26 is provided upstream of the evaporator coil 14. The heat recovery device 26 may take any of various forms such as a heat pipe, a heat recovery device with concentric side-by-side or cross flow adjacent channels such as are commercially available from Venmar Corporation, or an energy recovery wheel, or a heat receiving wheel either of which are commercially available from Engelhard/ICC. In any case, the heat recovery device has one or more heat rejection portions and one or more corresponding heat gaining portions. This is shown schematically in FIG. 1 as a heat rejection portion 27 and a heat gaining portion 28.

Placement of the heat recovery device 26 is such that the heat rejection portion 27 is in the flow pathway of the supply air to the space to be cooled, while the heat gaining portion 28 is in the flow pathway of the return air from the conditioned space. Upstream of the heat gaining portion 28 there is preferably installed an evaporative cooler 29 which is composed of a typical evaporative cooler media over which water is circulated. In this case, the evaporative cooler 29 is preferably placed below the evaporator coil 14 as shown such that the water for the evaporative cooler media is supplied by the condensate from the evaporator coil. A supplemental supply of water may be provided for extreme conditions, with any excess water being removed by way of a drain overflow. The evaporative cooler 29 functions to lower the dry bulb temperature of the return air while not effecting the wet bulb temperature thereof.

After passing through the evaporative cooler, the cooled return air is then passed through the heat gaining portion 28 of the heat recovery device 26, where a sensible heat gain is achieved in the air stream. The benefit of this function is not in the heat gain of the return air flow stream, but rather the counter effect that occurs in the heat rejection portion 27 as will be described hereinafter. The heated air passing out of the heat gaining portion 28 is then preferably passed through the condenser coil 12 as shown for the cooling of refrigerant, or some or all of it may be exhausted to the outdoors. In any case, none of the return air is used in the re-supply of air to the space to be cooled.

Considering now the other flow stream of air which is used to supply air to the space, outside air is brought in by way of blowers (not illustrated) in two air streams as indicated at the top of FIG. 1. One stream of air is passed through the condenser coil 12 for cooling of refrigerant and then passed to the outdoors. The other air stream, which is 100% outside air, is passed first through a filter 31 and then through the heat rejection portion 27 of the heat recovery device 26. After being cooled in the heat rejection portion 27, the air then passes through the evaporator coil 14, the subcooler coil 16 and to the space to be cooled. The air being so supplied is not only cooled but dehumidified as well.

Figure 2:
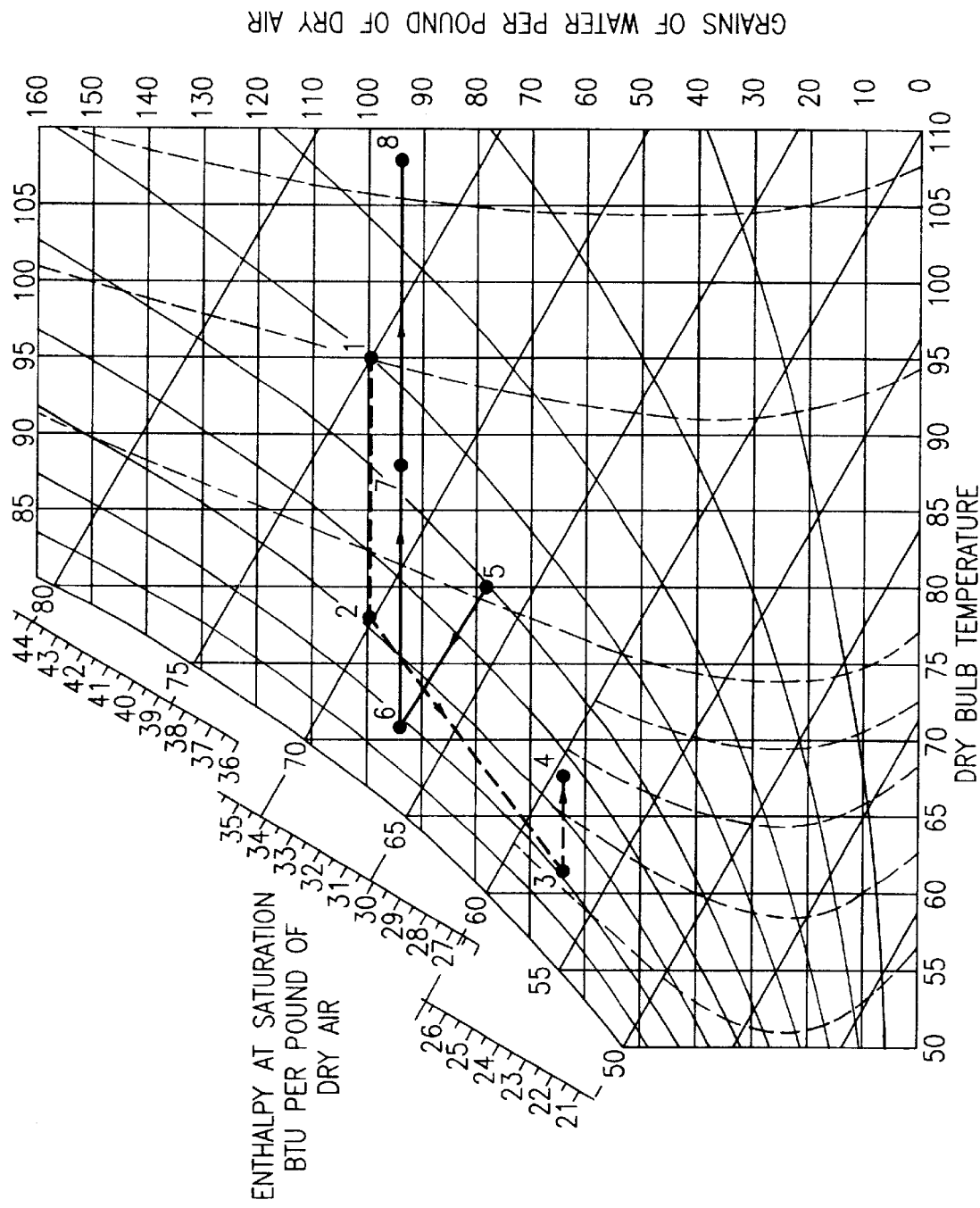
FIG. 2 is a psychrometric chart illustration for the cycles of both the return air and the supply air flowing through the system.

Considering now the psychrometric effect on each of the air streams, a chart is shown in FIG. 2, with the cycle of the return air being shown in solid line and that of the supply or entering outdoor air being shown in broken line.

Referring first to the entering outdoor air, the air enters at 95° F. dry bulb temperature and 75° F. wet bulb temperature as shown at point 1 in FIG. 2. The air is substantially cooled in the heat recovery device 26 and leaves at 78° F. dry bulb/70.5° F. wet bulb as shown at point 2. The air is then further substantially cooled by the evaporator leaving at 61.4° F. dry bulb/57.8° F. wet bulb as shown at point 3. Finally, the air passes through the subcooler where it is heated to 67.6° F. dry bulb/59.7° F. wet bulb as it subcools the refrigerant prior to its entering the evaporator coil by way of the expansion device 13. This condition of the air is as shown at point 4 on the chart.

Referring now to the flow of return air from the conditioned space, as it enters the evaporative cooler 29 it is at 80° F. dry bulb/67° F. wet bulb as shown at point 5. The evaporative cooler reduces the temperature to 71° F. dry bulb/ 67° F. wet bulb as shown at point 6. As the air passes through the heat gaining portion 28 of the heat recovery device 26 it is heated to 88° F. dry bulb/72° F. wet bulb as shown at point 7. Finally, it is further heated as it passes through the condenser coil to 108° F. dry bulb/77.4° F. wet bulb as it exhausts to outdoors as shown at point 8.

Another way to look at the chart of FIG. 2 is in terms of enthalpy. In passing from point 1 to point 2, which represents the cooling function made possible by the present invention as indicated by the graph connecting points 5, 6 and 7, there is an enthalpy change of 4.3 BTU/LB (i.e. 38.5–34.2). When this is compared with the total enthalpy change of 12.3 BTU/LB (i.e. 38.5–26.2), it represents the percentage of improvement, and can therefore be applied to determine the improved capacity in the total output of a system. That is, the improved capacity X of a standard 6 ton system by the incorporation of the present invention can be shown as X in the equation:

$$\frac{4.3\,\text{BTU/lb}}{12.3\,\text{BTU/lb}} = \frac{X-6}{X},$$

such that X is found to be 9.2. Thus, with the present invention installed in a standard 6 ton system one can obtain 9.2 tons of cooling capacity.

Figure 3:
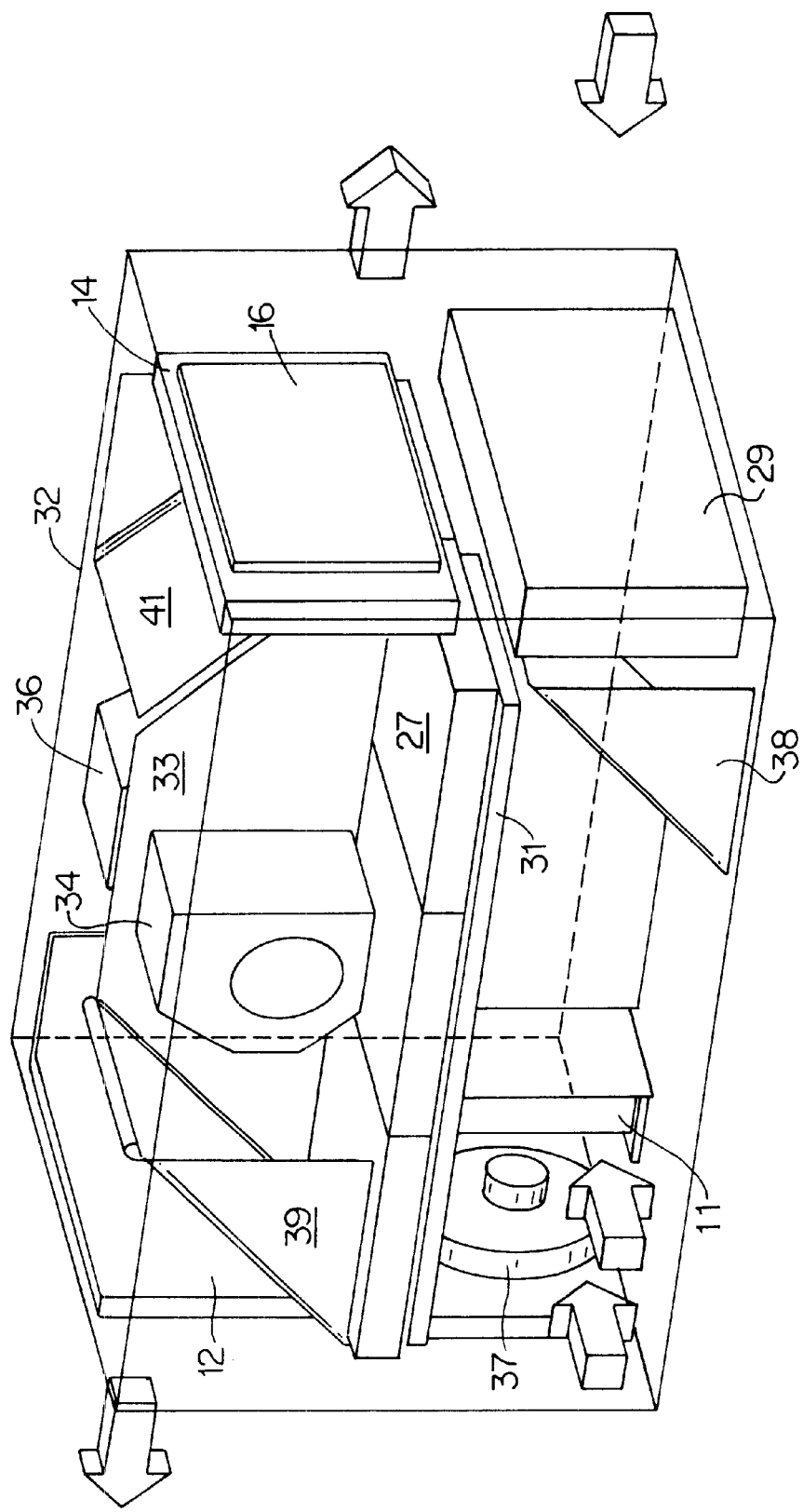
FIG. 3 is a perspective view of a packaged system in accordance with the present invention.

Referring now to FIG. 3, the invention is shown as incorporated into a packaged unit 32 which includes the blowers for moving both air streams therethrough. Generally, the supply air stream flows in the forward portion of the unit and the return air stream flows in the rearward side, with the front and rear sides being divided by a central, vertically disposed partition 33. Blowers 34 and 36 are disposed in the front and rear sections, respectively, to move those air streams through the system. A fan 37 is also provided to move the outside air through the condenser coil 12.

Considering first the outdoor air streams, outside air is drawn into the unit at the lower left portion of FIG. 3 by the fan 37, with the air flowing through the condenser coil 12 and being discharged outside. Another air stream, which is 100% outside air and comprises the supply air, is caused by the blower 34 to flow through the filter 31 and through the heat rejection portion 27 of the heat recovery device 26. A baffle 38 is provided to isolate the flow stream from the evaporative cooler 29 and the return air flow stream. In the upper left portion of the system, a baffle 39 is also provided to isolate this flow stream from the condenser coil 12 and the air stream flowing through it. After passing through the heat rejection portion 27, the cooled air is then forced by the blower 34 to flow through the evaporator coil 14 and the subcooler coil 16 to the space to be cooled.

On the return air side of the system, the blower 36 causes the air to be drawn in from the space, as indicated by the arrow at the lower right portion of FIG. 3, where it passes through the evaporative cooler 29. It than passes through the heat gaining portion 28 (not illustrated) behind the central partition 33. The blower 36 then forces the warmed air stream through the condenser coil 12 to the outside. A portion of this air flow stream may be diverted to the outside such that only a portion of it passes through the condenser coil 12, if desired. Another baffle 41 is provided to isolate the return air flow stream from the evaporator coil 14.

Although this invention has been shown and described with respect to a preferred embodiment, it will be understood to those skilled in the art that various changes in the form and details thereof may be made without departing from the spirit and scope of the claimed invention.

What is claimed is:

1. An improved conditioned air system of the type having an indoor coil, an outdoor coil, a compressor and an expansion device, wherein the improvement comprises:

a heat recovery device having a cooling portion and a heating portion operatively interconnected;

a blower for taking in return air from a space and passing it through said heat recovery device to be conditioned prior to being discharged outside;

a blower for bringing in substantially 100% outside air, passing it through said heat recovery device to be conditioned and then passing it through the indoor coil for further conditioning; and a subcooler downstream of said indoor coil such that the air passing from the indoor coil passes through the subcooler prior to its entering the space wherein said heat recovery device is a heat pipe.

2. An improved conditioned air system of the type having an indoor coil, an outdoor coil, a compressor and an expansion device, wherein the improvement comprises:

a heat recovery device having a cooling portion and a heating portion operatively interconnected;

a blower for taking in return air from a space and passing it through said heat recovery device to be conditioned prior to being discharged outside;

a blower for bringing in substantially 100% outside air, passing it through said heat recovery device to be conditioned and then passing it through the indoor coil for further conditioning; and a subcooler downstream of said indoor coil such that the air passing from the indoor coil passes through the subcooler prior to its entering the space and including an evaporative cooler disposed upstream from said heat recovery device such that the return air flows through said evaporative cooler prior to its being passed through said heat recovery device.

3. An improved conditioned air system of the type having an indoor coil, an outdoor coil, a compressor and an expansion device, wherein the improvement comprises:

a heat recovery device having a cooling portion and a heating portion operatively interconnected;

a blower for taking in return air from a space and passing it through said heat recovery device to be conditioned prior to being discharged outside;

a blower for bringing in substantially 100% outside air, passing it through said heat recovery device to be conditioned and then passing it through the indoor coil for further conditioning; and a subcooler downstream of said indoor coil such that the air passing from the indoor coil passes through the subcooler prior to its entering the space and including the step of providing an evaporative cooler upstream of said heat gaining portion, such that return air is passed through said evaporative cooler prior to flowing through said heat gaining portion.

\* \* \* \* \*